H. SINCLAIR.
TANK VALVE.
APPLICATION FILED MAR. 6, 1908.
910,874.
Patented Jan. 26, 1909.
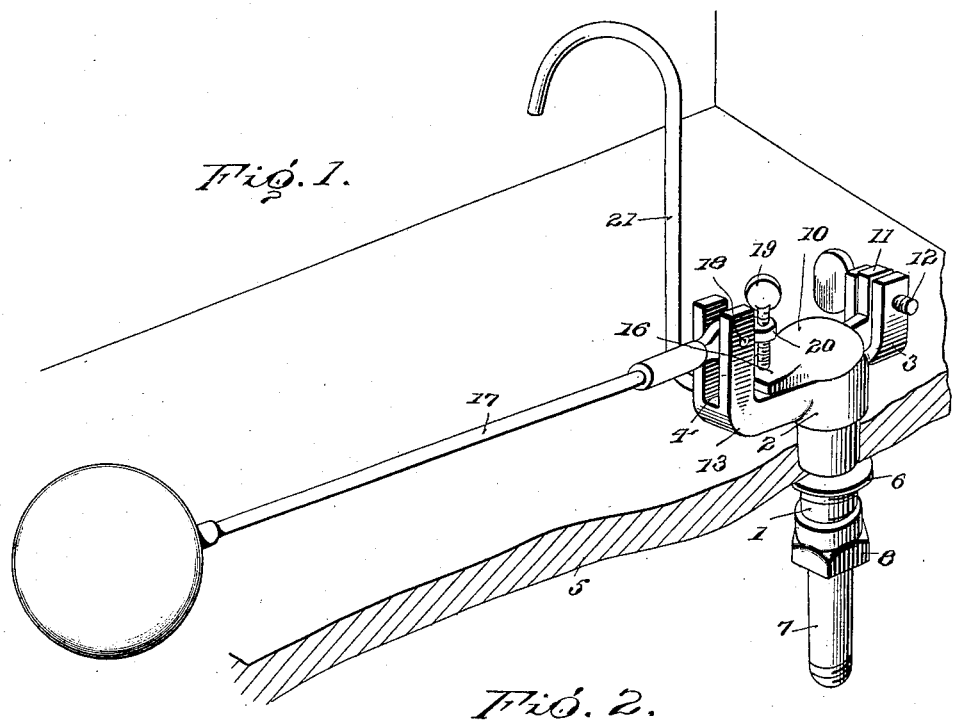
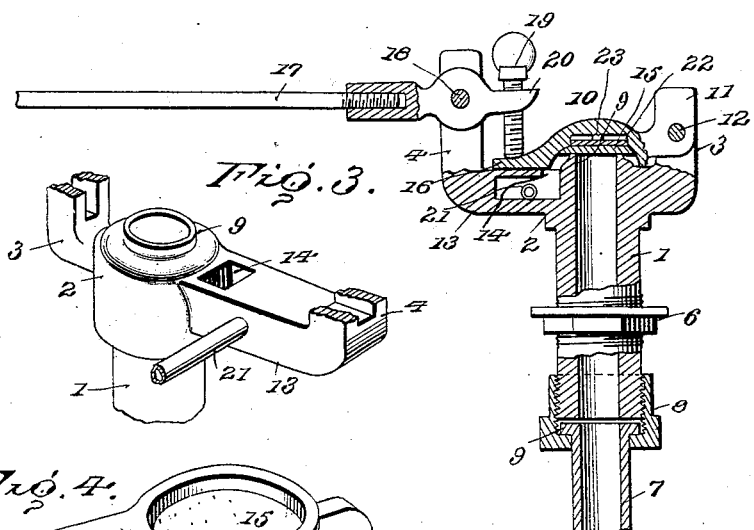
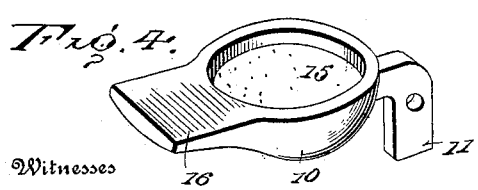
Inventor
H. Sinclair

UNITED STATES PATENT OFFICE.

HOWARD SINCLAIR, OF BUTLER, PENNSYLVANIA.

TANK-VALVE.

No. 910,874.     Specification of Letters Patent.     Patented Jan. 26, 1909.

Application filed March 6, 1908. Serial No. 419,540.

*To all whom it may concern:*

Be it known that I, HOWARD SINCLAIR, a citizen of the United States, residing at Butler, in the county of Butler and State of Pennsylvania, have invented certain new and useful Improvements in Tank-Valves, of which the following is a specification.

The present invention has for its object to devise a valve of peculiar construction and specially adapted for flush tanks, the purpose being to provide a valve which will positively close against the pressure of water by a float of minimum size and which valve may be conveniently and economically repaired and which will admit of adjusting the point of contact between the valve and float so as to adapt the latter for shutting off the supply of water at any required level in the tank.

For a full understanding of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit and essential features thereof, still the preferred embodiment is shown in the accompanying drawings, in which:

Figure 1 is a perspective view showing the application of the invention. Fig. 2 is a side view of the valve, parts being broken away. Fig. 3 is a detail view in perspective of the body of the valve, the adjunctive parts being omitted. Fig. 4 is a detail view in perspective of the valve proper as it will appear when inverted.

Corresponding and like parts are referred to in the following description and indicated in all the views of the drawings by the same reference characters.

The valve body comprises a stem 1, head 2 and uprights 3 and 4 projected from opposite sides of the head, said parts being preferably of integral formation. The stem 1 is externally threaded and adapted to pass through an opening in a tank 5, the lower end of the head 2 engaging with an overlapping portion of the tank bordering upon the opening through which the stem 1 passes. A nut 6 mounted upon the stem 1 is adapted to be turned up tight against the tank so as to secure the body of the valve thereto.

It is to be understood that suitable packing may be interposed between either the head or the nut, or both, and the tank to secure a tight joint.

The supply pipe 7 may be connected to the lower end of the stem 1 by means of a union 8 or in any convenient way. The head 2 and stem 1 are hollow and a rim 9 projects from the head 2 and constitutes a valve seat upon which the valve 10 closes.

The upright 3 has connection at its lower end with a side of the head 2 and its upper portion is forked to receive an extension 11 of the valve 10, said extension being connected to the spaced portions of the upright 3 by means of a pivot fastening 12. The upright 4 is forked and is connected at its lower end with a head 2 by means of a projection 13, the same being hollow and having an opening 14 in its top side.

The valve 10 is hollow upon its lower side and receives a packing 15 which insures the formation of a tight joint between the valve and the rim or seat 9. The lower hollow side of the valve 10 receives the upper portion of the head 2. The extension 11 of the valve 10 is of elbow form and its vertical portion fits snugly between the spaced portions of the upright 3 thereby preventing any lateral play of the valve and insuring its firm seating. A projection 16 extends from the valve 10 in an opposite direction to the extension 11 and overhangs the projection 13 and the opening 14 formed in the upper side thereof.

The float lever 17 is fitted between the spaced portions of the upright 4 and is connected thereto by means of a pivot fastening 18. A set screw 19 is threaded into an extension 20 at the inner end of the float lever 17 and is adapted to engage the projection 16 of the valve and constitute in effect an adjustable stop which may be regulated to enable the valve to close when the level of the water in the tank reaches the required point.

A small pipe 21 is threaded into a side of the hollow projection 13 and extends upwardly therefrom, the upper portion of said pipe curving downwardly. After the closet has been flushed and while the water is flowing through the valve into the tank, a certain proportion is deflected by the projection 16 through the opening 14 into the hollow projection 13, thence through the pipe 21 into the overflow and into the bowl to form a water seal to prevent escape of sewer gas.

The packing 15 is supported by means of a plate 22, which in turn bears centrally against a pivot projection 23, with the result that the packing will at all times squarely seat itself when the valve closes, and at the same time equalizes the pressure to prevent any undue wear upon any one part of the packing more than another.

Having thus described the invention, what is claimed as new is:

In a tank valve, the combination of a valve body having an opening surrounded by means of a seat, a hollow projection extended from the valve body and having an opening adjacent to the said seat, an overflow pipe leading from said hollow projection, and a valve for closing downward upon said seat and having a projection overhanging said hollow projection to deflect a portion of the water passing through the valve into the said hollow projection.

In testimony whereof I affix my signature in presence of two witnesses.

HOWARD SINCLAIR. [L. S.]

Witnesses:
 E. L. BLACK,
 MARTIN ESILER.